United States Patent Office 3,523,229
Patented Aug. 4, 1970

3,523,229
DIGITAL-ANALOG SERVO SYSTEM
Robert James Black, Los Gatos, and Frank John Sordello and Jack Stewart Swartz, San Jose, Calif., assignors to International Business Machines Corporation, Armonk, N.Y., a corporation of New York
Filed Jan. 5, 1967, Ser. No. 607,544
Int. Cl. G05b 19/38
U.S. Cl. 318—601                                10 Claims

ABSTRACT OF THE DISCLOSURE

A servo system which compares two digital input signals and provides an analog output proportional to the square-root of the difference between them. A binary counter and a phase discriminator compare digital values of actual and desired positions and provide an output signal relative to their difference. This output signal controls a positioning motor and is also fed back to control the rate of the binary counter, thus providing the square-root relationship. This system may be used for rapidly and accurately controlling the position of a movable member.

---

This invention relates to systems for utilizing digital input signals to provide an analog control function, and more particularly to systems for providing a servo error signal function that follows a predetermined characteristic.

In patent application Ser. No. 418,602, filed Dec. 16, 1964, entitled "Digital Comparison-to-Analog Signal Converter" by Robert J. Black and Frank J. Sordello, and assigned to the assignee of the present invention, there is described an improved servo system for controlling the position of a member in response to digital values. The actual position is compared to the desired position and an error signal is fed back to control the position of the member. Systems of this general type are widely employed in conjunction with magnetic disks, numerically controlled machine tools, plotting instruments and the like. Second order servos are widely employed for these purposes. A second order servo is one whose characteristic equation has two time constants, this condition generally being attained by ignoring negligible terms and making valid approximations as to other terms.

In second order servos using both position and velocity feedback, optimum time response is achieved if the position error signal function is shaped in accordance with a square root characteristic. Specifically, in general terms it is highly desirable to render the system non-linear in such fashion that for major differences between actual and desired positions the gain is smaller and transient response is stable whereas for small error conditions the gain is large and steady state operation is precisely controlled. Such a position error signal function provides a desirable combination of lower step response time and stable operation.

Such characteristics are, of course, desirable for many servo systems, whether or not the input signals are originally provided in digital form for both the desired and actual positions. Where the signals are provided in analog form, they may, of course, be converted to corresponding digital values if the purpose of shaping the error signal function justifies the attendant cost in added equipment.

Shaping of servo error signals to achieve specified control characteristics is now accomplished in many instances by using a passive non linear network in the output circuit or in a feedback circuit. Such arrangements are of limited utility and do not permit ready adjustment of the servo forward gain. Remote control systems and automatic systems of the process control type often require adjustment of the system gain, and this should be accomplished by a single voltage change, if possible. At other times, it is desirable to modify the error signal characteristic in accordance with an external control, so as to multiply one function against another to achieve a combined control purpose.

It is therefore an object of the present invention to provide an improved digital servo system.

Another object of the present invention is to provide an improved system for controlling the position of a movable member in response to the difference between the two digital values.

A further object of the present invention is to provide an improved servo system for controlling the position of a movable member, and including means for external control of the servo system gain.

These and other objects of the present invention are achieved by a system that generates a servo position error signal from digitally expressed address and position data by sequentially incrementing through the two digital values to provide a time-differing or phase relationship that is convertible to an analog control value, with the rate of incrementing being governed by the control value so as to modify the system gain.

In a specific example of a system in accordance with the invention, the position error signal function is shaped in a square root fashion by feeding back the error signal to control a variable frequency pulse generator that successively converts address and position values to variable duration intervals. The pulse generator may be, for example, a voltage controlled oscillator, used to advance a digital counter providing successively changing reference values within a given range, against which the address and position values may be compared. As the address and position values are reached by the counter in any sequence and with any permissible time difference, a pair of compare pulses are generated to represent, by the intervening time duration, the amplitude and sense of the position error component. An analog signal representative of this value is generated by a phase discriminator that receives the pair of compare pulses. The error signal is converted to a unidirectional signal representing the absolute value of the error signal, and the unidirectional signal controls the voltage controlled oscillator so as to decrease frequency when the position error decreases and to increase frequency when the position error increases. Thus the gain is changed so as to be low when the position error is high. The arrangement is such that the position error signal function is shaped in a square root fashion.

With this system, additional or separate control signals may be applied to the voltage controlled oscillator so as to vary the gain of the system further in predetermined fashion. For example, if the servo system is used for remote control of an actuator, externally applied control signals can set the oscillator at a selected frequency, or can be combined with the servo error signal itself in additive or multiplicative fashion.

The invention will be better understood in the light of the following description, together with the accompanying drawings, in which.

Figure 2:
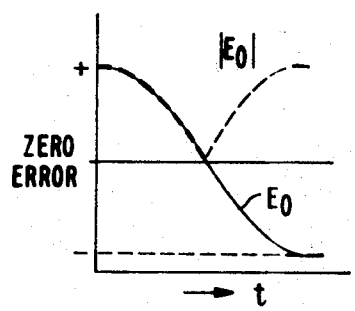
FIG. 2 is a graphical representation of relationships useful in describing the operation of the system of FIG. 1.

A servo system in accordance with the invention is useful in many servo applications, but is described in conjunction with a movable arm positioning mechanism for a random access memory of the rotating disc type. The movable arm mechanism 10 includes a plurality of transducers in a transducer assembly 12 disposed in magnetic flux interchange relationship with a recording surface on a rotating disc 14. The disc 14 is driven by a motor 16, and the data from the data source 20 is coupled to the individual heads in the transducer assembly 12 for affecting data recording and reproduction as desired. Inasmuch as this mechanism may be conventional, and comprise any one of a number of different types of movable positioning systems, details of the movable arm mechanism 10, transducer assembly 12, the disc 14, and the data source 20 have only been shown generally. For example, the data source 20 is only referred to generally for simplicity in the drawings, but should be taken to include the record driver amplifiers, the reproducing pre-amplifiers and the associated interface circuits typically used in these systems.

The data source 20 also provides commands for the movable arm mechanism 10, to effect data transfer at a selected track or tracks on the recording surface of the disc 14. Actual control of the position of the transducer assembly 12 is effected by a transducer positioning mechanism 22 coupled to pivot the movable arm mechanism 10. A digital position indicator 24 coupled to the transducer positioning mechanism 22 provides multi-bit binary signals representative of the actual position of the transducer assembly 12. Any one of a number of encoders may be used for this purpose, such as optical encoders which provide a direct binary representation of the rotary position of the shaft controlling the movable arm mechanism 10. Other types of encoders or analog signal generators coupled to control analog to digital converters, may, however, be used for the position indicator 24.

Figure 1:
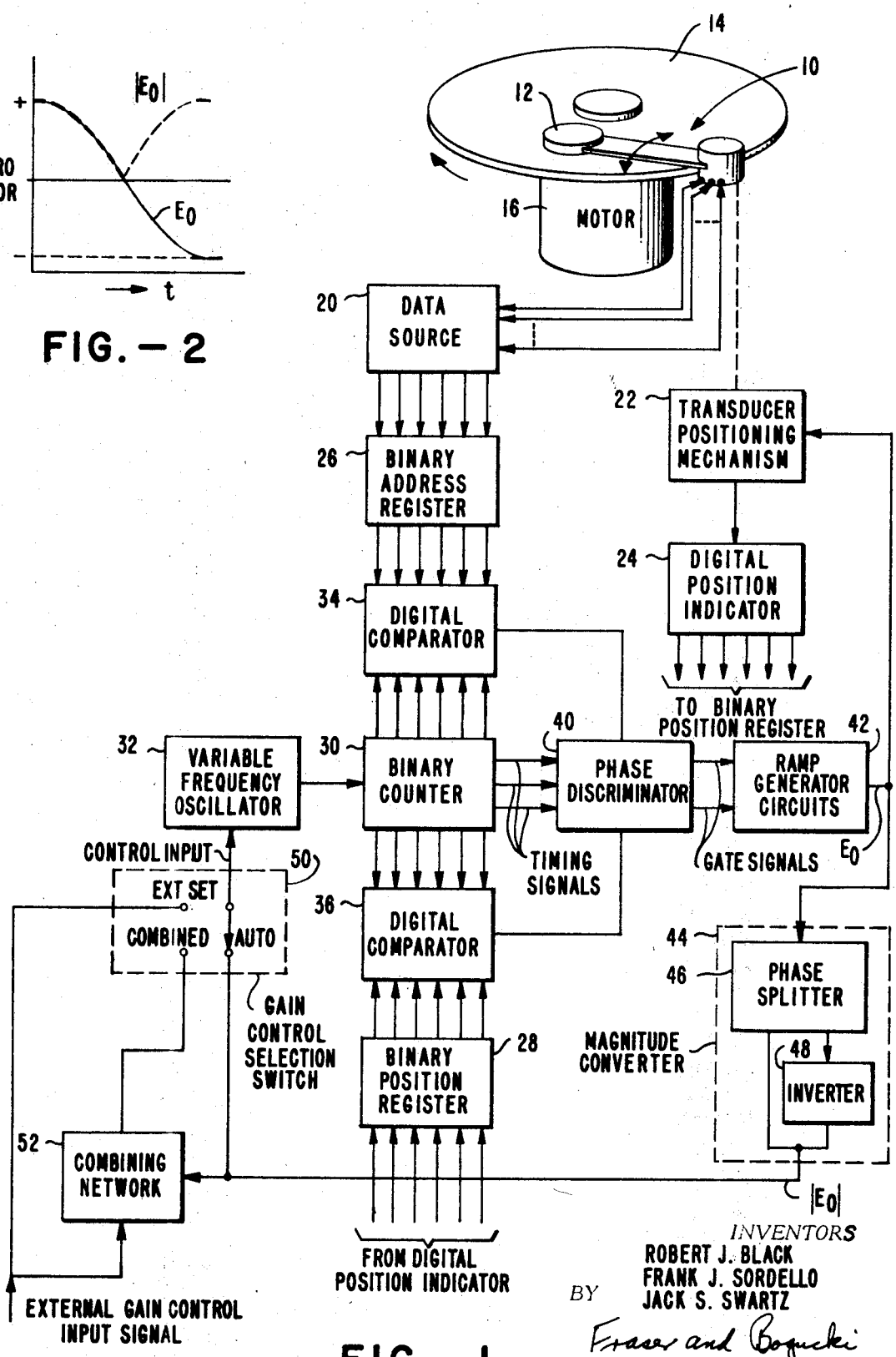
FIG. 1 is a simplified partial perspective and block diagram representation of the arrangement of one system in acordcance with the invention.

A portion of a system generating an error signal representative of the difference between the actual and desired positions is shown in FIG. 1 that corresponds generally to similar elements in the above identified patent application. In this system, the address desired for the transducer assembly 12 is entered from the data source 20 into a binary address register 26, while the actual position of the transducer assembly 12 is entered from the digital position indicator 24 into a binary position register 28. A binary counter 30 having a predetermined number of binary places is successively advanced from 0 to its maximum count in repetitive fashion. Incrementing or advancing of the binary counter 30 is controlled by a variable frequency oscillator 32 that operates in a selected frequency range sufficiently high (roughly, 10 times the register maximum count times the servo bandwidth) for the desired bandwidth of the servo. As the binary counter 30 cycles, the count presented by it is compared to the desired address maintained by the binary address register 26 in a digital comparator 34. Concurrently, the actual position count presented by the binary position register 28 is compared to the cycling count in a digital comparator 36. Each of the digital comparators 34, 36 respectively, provides a pulse output denoted as a "compare" pulse, at some time within the cycle of the binary counter 30. The time relationship between these two signals, which is referred to as the "time between compare pusles," is representative of the sense and amplitude of the deviation of the transducer assembly 12 from its desired position. The compare pulses are applied to a phase discriminator circuit 40, as described in the above identified application, that provides gate signals having a length or duration proportional to the time difference between the address compare pulse and the position compare pulse. These signals are provided at different output terminals in accordance with the error polarity relationships, and applied to ramp generator circuits 42 which convert the time duration signals to analog voltages. The ramp generator circiuts 42 are gated on at the initiation of an applied signal, with the ramp signal increase being terminated when the applied signal ends. The final level of the ramp is maintained for the remainder of the cycle. Separate signals may be generated for driving the transducer positioning mechanism 22 in or out, as shown in the above identified application or a bipolar signal may be generated for this purpose as shown.

In any event, a digital to analog conversion is effected, in which the two digital values are compared, and the difference between them is converted to a time interval. The time interval is defined by the time between compare pulses, and is subsequently converted to a given signal amplitude for controlling the servo system.

In accordance with the present invention, however, the position error signal function is shaped in square root fashion, to be summed with a velocity signal in order to achieve optimum time response. The error signal derived from the ramp generator circuits 42 is also fed back to control the variable frequency oscillator 32. The oscillator 32 frequency varies linearly with the applied control input signal. The control input applied to the variable frequency oscillator 32 is caused to vary in amplitude in accordance with the absolute value of the position error signal. To this end, the servo position error signal is passed through a magnitude converter 44, in which the error signal $E_0$ is passed through a phase splitter 46, with one output being inverted in a unity gain inverter 48. The signals in the two circuit paths are thereafter recombined with appropriate circuit isolation (not shown) if desired. The combined output signal from the magnitude converter 44 then is returned as the control input to the variable frequency oscillator 32.

This feedback arrangement functions to provide a non-linear servo in a manner described in detail hereafter. However, the versatility of the system is substantially increased by making use of variable control of gain, through a gain control selection switch 50. The gain control selection switch 50 comprises a single pole switch having three alternate positions, the position shown in FIG. 1 being the "Automatic" position in which gain is controlled solely by the feedback signal. In another position, "External Set" signal may be derived as an analog signal from a remote source, such as a data processing system. This signal may be provided in digital form and converted to an appropriate analog level (the converter not being shown), or, it may be determined by a potentiometer adjustment or by other means. In the third position of the switch 50, the external gain control input signal is combined with the feedback signal in a combining network 52 and the output signal is applied to a contact labelled as the "Combined" position for the switch 50. The combining network 52 may linearly sum the input signals, or may combine them in multiplicative or other fashion if desired.

In the operation of the servo system of FIG. 1, it will be observed that the amplitude of the error signal $E_0$ derived from the ramp generator circuits 42, is dependent upon the duration of the applied gate signal, which in turn is dependent upon the time difference between the compare signals. Because the time difference between the compare signals, for a given spacing between the actual and desired positions of the transducer assembly 12 is dependent upon the frequency of the variable frequency oscillator 32, the amplitude of the position error signal is dependent upon the position error signal itself. As shown in FIG. 2, the sense of the applied control input [$E_0$] is made positive in this example, and the oscillator 32 is coupled such that its frequency is directly related to the amplitude of the error signal. Consequently, with a high position error, the cycling count rate is increased and the time between compare pulses is reduced. Therefore, the position error signal itself is reduced, effectively decreasing the forward gain of the system. For large position error signals, the lowered system gain enhances stability without appreciably affecting response rate. As the position of the servo controlled transducer positioning mechanism 22 is corrected, the position error component decreases and the frequency of the oscillator 32 also decreases. With the slower cycling rate of the counter, time differential between the address and position compare pulses increases. The error signal is increased in accordance with the increased time between compare pulses. Consequently, in the small position error region, the cycling rate of the binary counter 30 is lowest and the forward gain is highest. This means that tracking ability and bandwidth are optimized in the small position error or steady state condition.

The manner in which a square root characteristic in the error servo function is achieved mathematically is shown by the following development, taking the value $[A-P]$ as the position error value.

$$E_0 = (K_{\text{time between compare pulses}}) [A-P] \triangleq (K_{\text{tbcp}})[A-P]$$

$$K_{\text{tbcp}} = (K_{\text{gain of phase discriminator}})$$

$$\left(\frac{1}{[K_{\text{oscillator}}][V_{\text{in oscillator}}]}\right) \triangleq (K_{\text{gopd}}) \left(\frac{1}{[K_{\text{osc}}][V_{\text{in osc}}]}\right)$$

$$E_0 = \frac{(K_{\text{gopd}})[A-P]}{[K_{\text{osc}}][V_{\text{in osc}}]}$$

because $$|E_0| = V_{\text{in osc}}$$

$$E_0 = \frac{(K_{\text{gopd}})[A-P]}{[K_{\text{osc}}](E_0)}$$

$$\therefore \frac{E_0{}^2 = (K_{\text{gopd}})[A-P]}{[K_{\text{osc}}}] \text{ or } E_0 = \sqrt{\frac{(K_{\text{gopd}})[A-P]}{(K_{\text{osc}}}}$$

Thus it may seem that the servo error signal, $E_0$, varies essentially as the square root of the difference between the address and position compare pulses because the gain of the system is controlled by the variable frequency oscillator control input signal alone.

This arrangement also permits remote or external control of the servo system gain simply by application of an input voltage. For control of set points in a process control system, for example: rather than having a potentiometer in series with the process control error signal which can be contaminated by external noise in going from the process area to the control panel and back, one may use this electrical signal to control gain from remote areas.

Figure 3:
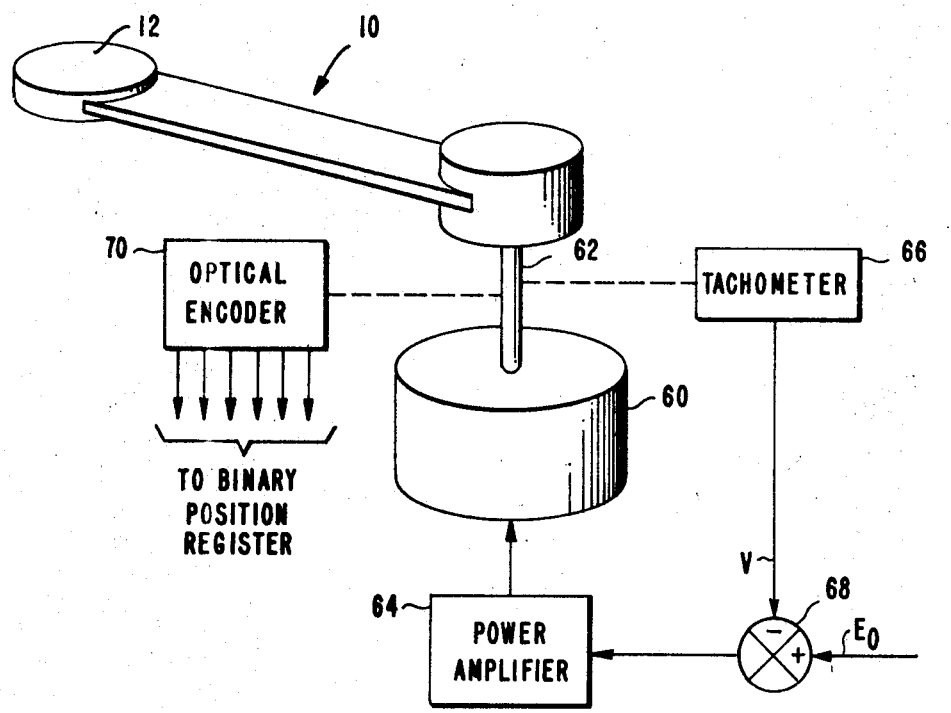
FIG. 3 is a partial perspective and block diagram representation of one arrangement for utilizing a position error signal generated by the arrangement of FIG. 1.

As previously mentioned the position error signal $E_0$ which is the square root of the actual position error is summed with a velocity signal to achieve optimum time response. One practical arrangement for accomplishing this is shown in FIG. 3 wherein the transducer positioning mechanism 22 of FIG. 1 comprises a motor 60 coupled by an associated shaft 62 to position the movable arm mechanism 10, a conventional power amplifier 64 coupled to energize the motor 60, a tachometer 66 for providing a velocity signal V representing the velocity of the shaft 62, and a conventional summing network 68 for providing the algebraic combination of the velocity signal V and position error square root signal $E_0$ to the power amplifier 64. In the arrangement of FIG. 3 the digital position indicator 24 of FIG. 1 comprises an optical encoder 70 which provides the position signal to the binary position register 28 in response to the angular position of the shaft 62.

The arrangement of FIG. 3 drives the arm mechanism 10 in accordance with the difference between the velocity V and the square root $E_0$ of the position error. In a system employing a square root function, if constants are ignored the relationship between the velocity and position error to provide optimum response may be expressed in simplified form by the equation: $V^2 = P$ where V is the velocity error and P is the position error. The velocity V is considered to be an error since the system is not truly without error upon reaching the desired position unless it remains at rest in that position.

Figure 4:
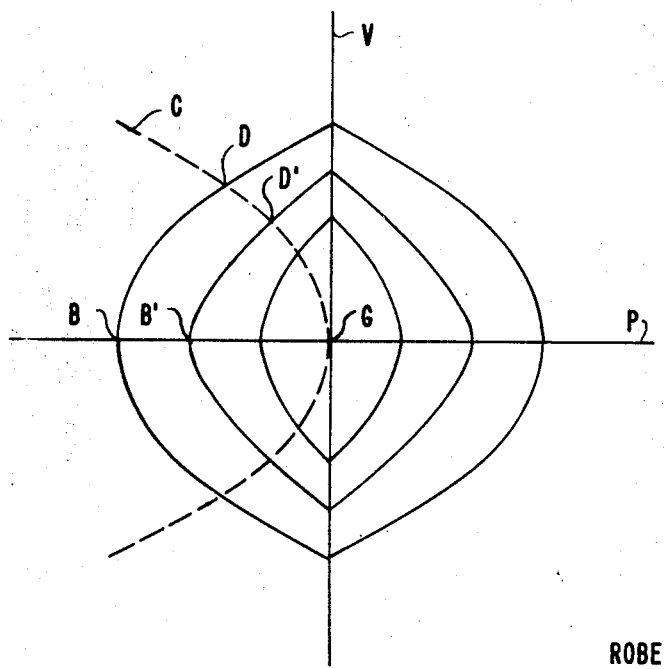
FIG. 4 is a graphical representation of relationships useful in describing the operation of the arrangements of FIGS. 1 and 3.

FIG. 4 is a phase portrait of an undamped bang-bang servo system employing a square root function such as expressed by the equation $V^2 = P$. Position and velocity are respectively represented by the horizontal and vertical axes and a switching trajectory which represents the equation $V^2 = P$ is illustrated by the dashed parabolic curve C. Assuming that the initial condition is a negative position error corresponding to the point B, the system accelerates along a trajectory BD by energizing appropriate means such as the motor 60 in the arrangement of FIG. 3. Upon reaching the point D which lies on the curve C, the acceleration is terminated, such as by de-energizing the motor 60 in FIG. 3, and the system decelerates by braking along the trajectory DG and coming to rest at the point G. The point G at the origin of the phase portrait represents the ideal or errorless condition of the system where there is no velocity V or position error P. In similar fashion, if the position error is initially at the point B' the system accelerates along the trajectory B'D', then decelerates along the trajectory D'G. The points D and D' are points of reversal which are properly selected to provide for deceleration so that zero error and zero error rate are reached simultaneously at the point G.

It will therefore be appreciated that systems in accordance with the present invention provide for optimum response employing a square root function. The ideal equation $V^2 = P$ which may be written in another form as $V = \pm \sqrt{P}$ or $V = E_0$ is provided by the algebraic combination of the velocity error signal V and the position error square root signal $E_0$ in the summing network 68 in the arrangement of FIG. 3.

While the invention has been particularly shown and described with reference to a preferred embodiment thereof, it will be understood by those skilled in the art that the foregoing and other changes in form and detail may be made therein without departing from the spirit and scope of the invention.

What is claimed is:

1. A non-linear servo having a square-root position error signal function comprising: means including an incrementing counter for comparing digital values of desired and actual positions; means responsive to the means for comparing for providing an analog signal in response thereto; controllable variable frequency means coupled to increment said counter; and magnitude converter means responsive to said analog signal and coupled to control said variable frequency means in correspondence with the absolute value of said analog signal.

2. A non-linear servo having a square-root position error signal function comprising: means including an incrementing counter for comparing the values of desired and actual positions; means responsive to the means for comparing for providing an analog signal in response thereto; controllable variable frequency means coupled to increment said counter; magnitude converter means responsive to said analog signal and coupled to control said variable frequency means in correspondence with the absolute value of said analog signal; and means for providing a signal representing the velocity of an element to be positioned by said servo and means for driving said element in accordance with the combination of said velocity signal and said analog signal.

3. A non-linear servo having a square-root position error signal function comprising: means including an incrementing counter for comparing the values of desired and actual positions, the means for comparing providing a difference value $[A-P]$ and a gain constant $K_1$; means responsive to the means for comparing for providing an analog servo position error signal $E_0$ in response thereto; controllable variable frequency means having a gain constant $K_2$ coupled to increment said counter; and magnitude converter means responsive to said analog position error signal $E_0$, where $$E_0 = \sqrt{\frac{K_1[A-P]}{K_2}}$$

coupled to control the variable frequency means in correspondence with a signal $|E_0|$.

4. A system for shaping the position error signal function in a non-linear servo including means for providing desired and actual position addresses for the mechanism in the form of first and second counts, said system comprising: incrementally operable counter means; variable frequency means having a control input and coupled to increment said counter means; means responsive to said first and second digital counts and said counter means for providing an analog signal representative of the difference between said digital counts; and means responsive to said analog signal and coupled to the control input of said variable frequency means and operating to vary the frequency in accordance with the absolute value of said analog signal.

5. The invention as set forth in claim 4 above, wherein said variable frequency control means varies linearly in frequency with control input variations, and wherein said means coupled to the control input of said variable frequency means includes magnitude converter means for providing a unidirectional signal representative of the absolute value of said analog signal and coupled to increase the frequency of said variable frequency means in response to increases in the absolute value of said analog signal.

6. A non-linear feedback control system for a controlled mechanism comprising the combination of a variable frequency oscillator; a cycling digital counter coupled to be advanced by said variable frequency oscillator; means providing a digital representation of the desired position for the controlled mechanism; means providing a digital representation of an actual position for the controlled mechanism; first means responsive to said binary counter and said desired position representation for generating an address compare pulse; second means responsive to said actual position representation and said binary counter for generating a position compare pulse, said address and position compare pulses occurring within each cycling interval of said digital counter; means responsive to the time interval between said address and position compare pulses for generating an analog signal proportional thereto; and means responsive to said analog signal and coupled to control said variable frequency oscillator in accordance with the absolute amplitude of said analog signal, to provide a frequency that is directly related to the absolute value of the amplitude of said analog signal.

7. A system for controlling a drive mechanism, the position of which is represented in digital form, in response to a command address represented in digital form, comprising a variable frequency pulse source whose frequency varies linearly in response to the signal level at a control input, a digital counter responsive to pulses from the pulse source for cycling in synchronism therein, first and second comparators responsive to the digital position representation and the digital command address representation for developing pulse signals at particular points in time relative to the count cycle of the counter corresponding respectively to the digital position and digital command address, a signal generator responsive to the pulse signals from the first and second comparators for generating analog signals which vary as a function of the time interval between said pulse signals within a given cycle of the digital counter, said analog signals when summed with a velocity signal providing control of the drive mechanism, means responsive to the analog signals for providing a signal representing the absolute value of the signal from the signal generator, and feedback means responsive to the absolute value signal for controlling the variable frequency pulse source in a sense to vary the frequency thereof in accordance with the absolute value of the analog signals to modify the cycling rate in response to increases in the absolute value of the analog signal.

8. The invention as set forth in claim 7, wherein said variable frequency pulse source comprises a voltage controlled oscillator, wherein said signal generator comprises a ramp generator for initiating and terminating a ramp signal with said pulse signals, and maintaining the level of the ramp signal at the termination thereof.

9. The invention as set forth in claim 8 above, wherein said feedback means includes a magnitude converter circuit comprising phase splitter means, and unity gain means for inverting the polarity of signals of one given polarity.

10. The invention as set forth in claim 7, further including motor means coupled to position said drive mechanism, tachometer means coupled to said motor means for providing a signal representing the velocity thereof, and means for driving said motor means in accordance with the algebraic sum of said velocity signal and said analog signals.

References Cited

UNITED STATES PATENTS

| 3,377,533 | 4/1968 | Lenz | 318—18 |
| 3,400,314 | 9/1968 | Wilson | 318—28 XR |
| 3,427,442 | 2/1969 | Sklaroff | 318—18 XR |
| 3,428,876 | 2/1969 | Kelling | 318—28 XR |

R. BENJAMIN DOBECK, Primary Examiner

U.S. Cl. X.R.

318—603